United States Patent
Harris et al.

(10) Patent No.: US 7,125,919 B2
(45) Date of Patent: Oct. 24, 2006

(54) METHOD OF IMPROVING VISCOSITY STABILITY UPON ADDITION OF A COLORANT COMPONENT

(75) Inventors: Jerome Michael Harris, Penllyn, PA (US); Henry Jude Eichman, Havertown, PA (US); Ronald Carl Faulk, Willow Grove, PA (US)

(73) Assignee: Rohm and Haas Company, Philadelphia, PA (US)

( * ) Notice: Subject to any disclaimer, the term of this patent is extended or adjusted under 35 U.S.C. 154(b) by 218 days.

(21) Appl. No.: 10/407,959

(22) Filed: Apr. 4, 2003

(65) Prior Publication Data

US 2003/0176569 A1 Sep. 18, 2003

Related U.S. Application Data

(63) Continuation-in-part of application No. 10/025,706, filed on Dec. 26, 2001, now Pat. No. 6,887,928.

(60) Provisional application No. 60/271,997, filed on Feb. 28, 2001.

(51) Int. Cl.
*C08J 3/00* (2006.01)
*C08K 3/20* (2006.01)
*C08L 75/00* (2006.01)
*C08L 3/02* (2006.01)
*C08L 5/16* (2006.01)

(52) U.S. Cl. ............... 524/48; 524/500; 524/501; 524/502; 524/515; 524/522; 524/523; 524/525; 524/591; 524/839; 524/840; 524/27; 524/507

(58) Field of Classification Search ............... 524/591, 524/839, 840, 501, 500, 502, 515, 522, 523, 524/525, 27, 48, 507
See application file for complete search history.

(56) References Cited

U.S. PATENT DOCUMENTS

| 4,507,426 A | 3/1985 | Blake, Jr. |
| 5,137,571 A | 8/1992 | Eisenhart et al. |
| 5,270,399 A | 12/1993 | Czornij et al. |
| 5,376,709 A | 12/1994 | Lau et al. |
| 5,605,974 A | 2/1997 | Carpenter et al. |

FOREIGN PATENT DOCUMENTS

| EP | 0460896 A1 | 12/1991 |
| EP | 0614950 A1 | 3/1994 |
| EP | 0747456 A2 | 5/1996 |
| EP | 0867481 A1 | 3/1997 |
| WO | WO 93/09187 | 5/1993 |
| WO | WO 00/22050 | 4/2000 |

OTHER PUBLICATIONS

Freidun M. Anwari and Fred G. Schwab, Optimizing Latex Paint Rheology With Associate Thickeners, Advanced Chem. Ser., Polymers in Aqueous Media, v. 223, p. 527-542, 1989.
U.S. Appl. No. 09/785,376, Nungesser et al.

*Primary Examiner*—Patrick D. Niland
(74) *Attorney, Agent, or Firm*—Kim R. Jessum; Carl P. Hemenway

(57) ABSTRACT

A tinting composition containing a colorant component is disclosed. In addition, a method of improving the viscosity stability of a composition upon the addition of a colorant component employing an associative thickener, a macromolecular organic compound having a hydrophobic cavity, a dispersing resin and combinations thereof is disclosed.

5 Claims, No Drawings

METHOD OF IMPROVING VISCOSITY STABILITY UPON ADDITION OF A COLORANT COMPONENT

This application is a continuation-in-part of U.S. application Ser. No. 10/025,706 filed on Dec. 26, 2001 now U.S. Pat. No. 6,887,928, which claims priority from U.S. Provisional Application Ser. No. 60/271,997 filed on Feb. 28, 2001.

This invention relates to a tinting composition and a method of improving the viscosity stability of a coating composition upon the addition of a colorant component.

Associative thickeners are water-soluble or water-swellable polymers that have chemically attached hydrophobic groups. The associative thickeners operate to thicken systems to which they are added by the non-specific associations, such as adsorption on surfaces and aggregation in solution akin to micellization, between the hydrophobic groups on the thickener molecules and moieties on the other components in the system, similar to the non-specific associations of conventional surfactants.

Since the hydrophobic association exhibited by associative thickeners is non-specific, it is greatly influenced by the presence of surfactants and water miscible organic solvents. The hydrophobes of surfactants may compete for adsorption sites on particle surfaces, and can hinder or enhance associations between thickener hydrophobes, depending on the surfactant HLB. Once an associative thickener is completely desorbed from a particle, such as a latex particle, it can behave like a non-adsorbing thickener and flocculate the latex by the volume restriction process.

A classic problem in paints and other coatings containing associative thickeners is a drop in mid-shear (Krebs-Stormer) viscosity when colorants that contain high levels of surfactant are added. This is especially problematic when the paint will be tinted to a deep tone because a high level of surfactant generally accompanies the colorant. Colorants are added to paints in units of milliliter of colorant per liter of paint (hereinafter referred to as "ml/liter") or ounces of colorant per gallon of paint (hereinafter referred to as "oz/gal"). Light-tint (pastel) paints typically contain no more than 31.2 ml/liter (4 oz/gal) of colorant. Mid-tone paints typically contain from greater than 31.2 ml/liter (4 oz/gal) to 62.5 ml/liter (8 oz/gal) of colorant. Deep tone paints typically contain at least 62.6 ml/liter (8 oz/gal) of colorant.

Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost or both, particularly in deep tone paints.

U.S. Pat. No. 5,137,571 and U.S. Pat. No. 5,376,709 disclose methods for using cyclodextrin-containing compounds with associative thickeners for a number of uses, including to reduce the viscosity drop of formulations upon the addition of colorants to the formulation. In Example 9 of U.S. Pat. No. 5,137,571, β-cyclodextrin, β-cyclodextrin ethoxylate and β-cyclodextrin propoxylate were added to a latex paint formulation containing a hydrophobically-modified ethoxylated urethane resin ("HEUR") to form viscosity-stabilized latex paint formulations. The Krebs-Stormer viscosity of each formulation was measured. Two ounces/gallon of paint of predispersed lampblack colorant were added to the viscosity-stabilized latex paint formulations and the Krebs-Stormer viscosity of each formulation was again measured. The use of post-added cyclodextrin in each case provided a reduction in the viscosity change before and after colorant addition relative to a control system containing no cyclodextrin. The same trend was shown in Example 2 (Table 3.1) of U.S. Pat. No. 5,376,709.

One of the drawbacks of the approach disclosed in U.S. Pat. No. 5,137,571 and U.S. Pat. No. 5,376,709 is that a single level of cyclodextrin was added to the paint formulation. This does not take into account the type and level of colorant that may be added during the tinting process. As such, if the type and level of cyclodextrin is optimized for one particular colorant, such as lampblack colorant of Example 9 supra, then it is unlikely that the type and level of cyclodextrin will be optimized for any other type of colorant. Thus, in some cases too much cyclodextrin may be employed and in some cases too little cyclodextrin may be employed. If the formulation utilizes the maximum level of cyclodextrin to counteract the largest expected viscosity drop (based on colorant type and level), then excess cyclodextrin will be used for most formulations. This is a wasteful and costly approach.

Another drawback to previous approaches is that, in some cases, even when the mid-shear viscosity of a paint or other coating is stable, the low-shear viscosity may not be stable. It would be desirable to stabilize both the mid-shear and the low-shear viscosity of the paint or other coating.

Many conventional tinting machines employ twelve different colorants to mix the large palette of colors typically offered for most paint lines. Thus, it would be highly desirable to tailor the viscosity stability of any given formulation based on the type and level of colorant component to be added so the proper type and level of cyclodextrin is employed. The composition and method of the present invention provide such a solution.

The first aspect of this invention provides a tinting composition containing at least one colorant composition and from 0.05 to 15% dry weight of at least one additive selected from associative thickeners and macromolecular organic compounds having a hydrophobic cavity, based on the weight of the at least one colorant composition.

The second aspect of the present invention provides a method of improving the viscosity stability of a coating composition upon the addition of a colorant component, including the steps of providing a base paint; and adding to the base paint, a tinting composition containing at least one colorant composition and from 0.05 to 15% dry weight of at least one additive selected from associative thickeners and macromolecular organic compounds having a hydrophobic cavity, based on the weight of the at least one colorant composition.

As used herein, "base paint" shall mean a composition that is capable of becoming a paint or other coating composition after addition of at least one tinting composition and optionally other ingredients. In some cases, the base paint may also be useful as a coating composition even without addition of tinting composition or other ingredients.

As used herein, "universal colorant" shall mean a colorant that is compatible with both water-based and nonaqueous-based compositions.

As used herein, "compatible" shall mean the mixture of the colorant component and base do not evidence signs of colloidal instability such as flocculation or syneresis or both. Preferably, the mixture exhibits less than 5 g of residue such as gel and grit per liter of the composition when the composition is passed through a 200 mesh screen, more preferably less than 1 g of residue.

As used herein, pigment volume concentration (referred to herein as "PVC") is a measure of how "binder-rich" a formulation is. It is calculated herein by the following formula:

$$PVC = 100\% \times \frac{(\text{volume of pigment(s)} + \text{volume of extender(s)})}{(\text{volume of pigment(s)} + \text{volume of extender(s)} + \text{volume of binder(s)})}$$

As used herein, volume solids content ("VS" herein) is the dry volume of pigment(s) plus the dry volume of extender(s) plus the dry volume of binder(s). It is calculated herein by the following formula:

$$VS = 100\% \times \frac{(\text{dry volume of pigment(s)} + \text{dry volume of extender(s)} + \text{dry volume of binder(s)})}{(\text{total volume of formulation})}$$

If additives are present, their volumes are not included in determining the total dry volume.

As used herein, "KU" shall mean Krebs unit and is a measure of the mid-shear viscosity as measured by a Krebs-Stormer viscometer.

As used herein, "viscosity stability" shall mean the ability of a composition to resist change in viscosity as measured by KU upon the addition of surfactant or a composition containing surfactant. A preferred viscosity stabilizer for latex paints must provide KU viscosity changes of less than about 10 units upon the addition of up to 93.7 ml/liter (12 oz/gal) of colorant. A more preferred viscosity stabilizer for latex paints must provide KU viscosity changes of less than about 5 units upon the addition of up to 93.7 ml/liter (12 oz/gal) of colorant.

The present invention is contemplated to be useful for stabilizing the viscosity of a wide variety of coating compositions, including paints and other coatings. The problem of viscosity instability due to colorant addition is known to affect a wide variety of coating types, and the present invention is contemplated to be useful in solving this problem in paints as well as in other types of coatings.

The present invention relates to a tinting composition useful for preparing a coating composition with improved viscosity stability. The tinting composition contains at least one colorant composition and at least one additive. The tinting composition may be employed as an universal colorant.

The colorant composition is a material or mixture of materials added to a composition to impart color to another substance or mixture of materials (herein, to the "base paint") and includes pigments, metal effect agents, and combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toulidine red), quinacridone magenta, quinacridone violet, DNA orange, and organic yellow pigment (such as Hansa yellow) and combinations thereof. An examples of a metal effect agent includes mica having a titanium dioxide layer.

The colorant composition includes surfactants and optionally dispersants to aid in the dispersion and the stabilization of the pigments or the metal effect agents in the liquid medium of the colorant composition. The liquid medium may contain water, glycols such as ethylene glycol and propylene glycol, and alcohols such as isopropanol. Other materials commonly included in colorant compositions are dispersing resins; polyethylene oxide polymers; polyethylene oxide glycols; extenders such as talc and calcium carbonate; humectants; thickeners; defoamer; and biocides.

The tinting composition may contain more than one colorant composition. For example, a tinting composition having a brown hue may be prepared by combining a red colorant composition and a yellow colorant composition.

The tinting composition of the present invention also contains at least one additive to compensate for the viscosity decrease which occurs upon the addition of the colorant composition to a base paint. The additive is an associative thickener or a macromolecular organic compound having a hydrophobic cavity. The tinting composition may contain one or more associative thickeners, one or more macromolecular organic compounds having a hydrophobic cavity, or a combination thereof. The level and the type of the associative thickener, and the level and the type of the macromolecular organic compound having a hydrophobic cavity is chosen to provide a tinting composition that reduces the viscosity decrease upon addition to a base paint. Factors affecting the choice of the associative thickener include the backbone type, the hydrophobe level, the hydrophobe type, and the molecular weight of the associative thickener. Further, it is desirable that the tinting composition has a viscosity which allows easy handling and permits facile mixing into a base paint.

The associative thickener is a water-soluble or water-swellable polymer that has chemically attached hydrophobic groups. Examples of associative thickeners include nonionic hydrophobically modified ethylene oxide urethane block copolymers (referred to herein as "HEUR"), hydrophobically modified alkali soluble polymers including hydrophobically modified alkali soluble emulsions (referred to herein as "HASE"), hydrophobically-modified celullosics, including hydrophobically-modified hydroxyethyl cellulose (referred to herein as "HMHEC"), hydrophobically modified poly(acrylamide), and mixtures thereof. The tinting composition may contain 0.05 to 15% dry weight, preferably from 0.1 to 12% dry weight, and more preferably, from 0.2 to 10% dry weight of the one or more associative thickeners, based on the total weight of the colorant composition.

An important characteristic of an associative thickener is the ratio of its effect at low shear to its effect at medium shear. Many formulations have lower viscosity at medium shear than at low shear, and this change in viscosity is often called "shear thinning." The tendency of a given thickener to cause shear thinning is characterized herein using the "shear thinning indicator," which is measured by adding a standard amount of that thickener to a standard test composition; the thickened standard test composition is measured, and the ratio of low-shear viscosity to mid-shear viscosity is the shear thinning indicator.

The standard test composition used herein for measuring the shear thinning indicator is formulated as follows:

First, a premix is formed by mixing the following:

| Ingredient | Manufacturer | parts by weight, as supplied |
|---|---|---|
| Tamol ™ 681 dispersant | Rohm and Haas Co. | 4.38 |
| Nuosept ™ 95 preservative | Degussa | 0.22 |
| Foamaster ™ AP defoamer | Henkel | 0.55 |
| propylene glycol | (commodity) | 4.35 |
| ammonia (28%) | (commodity) | 0.14 |
| Triton ™ GR-7M dispersant | Dow Chemical | 0.25 |

Next, the test composition is formed by mixing the following:

| Ingredient | Supplier | parts by weight, as supplied |
|---|---|---|
| premix | | 14.97 |
| Rhoplex ™ HG-74P latex | Rohm and Haas Co. | 82.93 |
| water | | 2.10 |

The procedure for using the test composition for measuring the shear thinning indicator is as follows. From the batch of test composition, a convenient amount of test composition is removed, thickener is added to that convenient amount of test composition, with stirring, in an amount such that the ratio of the total weight of thickener (as supplied, including solvents, etc.) to the weight of test composition (not including the weight of thickener) is 0.02. The low-shear viscosity of the thickened test composition is measured with a Brookfield viscometer at 6 rpm, using ASTM method D 2196-99, Method A, and the results are recorded in units of centipoise, which are equivalent to milliPascal-seconds ("mPa*s"). Also, the mid-shear viscosity is measured with a Stormer viscometer, using ASTM method D 562-01, and the results are recorded in Krebs Units ("KU"). The shear thinning indicator for that thickener is the ratio of the Brookfield result to the Stormer result. Further thickeners may be tested by taking further convenient amounts of test composition from the batch of test composition and repeating the above procedure for each thickener.

A thickener with shear thinning indicator of above 250 will be known herein as "highly shear thinning"; one with shear thinning indicator above 20 and less than or equal to 250 as "moderately shear thinning"; one with shear thinning indicator above 2 and less than or equal to 20 as "mildly shear thinning"; and one with shear thinning indicator of 2 or less as "non shear thinning." It is contemplated that every associative thickener will belong to one of these four categories: (1) highly shear thinning, (2) moderately shear thinning, (3) mildly shear thinning, and (4) non shear thinning.

Thickeners and thickener packages, including those of the present invention, may be used in a wide variety of useful compositions. The tests using the test composition, defined above, are for the purpose of characterizing each thickener. The testing does not mean or imply that the thickeners discussed herein, including those of the present invention, are limited in their use to compositions that incorporate or to compositions that are similar to those of the test composition.

The macromolecular organic compound having a hydrophobic cavity is a compound which may complex with surfactant to diminish the viscosity lowering effect of the surfactant on the coating composition. Examples of macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring has been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative.

The cyclic oligosaccharides having a hydrophobic cavity, such as cycloinulohexose, cycloinuloheptose, useful in the composition and method of the invention are described by Takai et al., *Journal of Organic Chemistry*, 1994, volume 59, number 11, pages 2967–2975.

The calyxarenes useful in the composition and method of the invention are described in U.S. Pat. No. 4,699,966, WO 89/08092; JP-A-88/197544 and JP-A-89/007837.

The cavitands useful in the composition and method of the invention are described in Italian application 22522 A/89 and Moran et al., *Journal of the American Chemical Society*, volume 184, 1982, pages 5826–5828.

The non-cyclic polysaccharides useful in the composition and method of the invention are described in PCT application WO 98/24821. Suitable non-cyclical polysaccharides include both unmodified polysaccharides and modified polysaccharides which are partially or totally derivatized on the hydroxyl groups.

The tinting composition may contain from 0.05 to 15% dry weight, preferably from 0.1 to 12% dry weight, and more preferably, from 0.2 to 10% dry weight of the one or more macromolecular organic compounds having a hydrophobic cavity, based on the total weight of the colorant composition.

Dispersing resins such as styrenated acrylates may be added to the tinting composition to aid in the dispersion or stability of the pigments and metal effecting agents.

In one embodiment, the tinting composition contains at least one associative thickener and at least one macromolecular organic compound having a hydrophobic cavity. The total level of the associative thickener and the macromolecular organic compound having a hydrophobic cavity is in the range of from 0.05 to 15% dry weight, preferably from 0.1 to 12% dry weight, and more preferably, from 0.2 to 10% dry weight, based on the total weight of the colorant composition. In a preferred embodiment, the ratio of the associative thickener and the macromolecular organic compound having a hydrophobic cavity is in the range of 4:1 to 1:4, preferably in the range of 3:1 to 1:3, and more preferably in the range of 2:1 to 1:2, based on the dry weights of the associative thickener and the macromolecular organic compound having a hydrophobic cavity.

In one embodiment, the tinting composition contains at least one associative thickener and at least one macromolecular organic compound having a hydrophobic cavity. In this embodiment, the ratio of these two additives is such that the moles of the macromolecular organic compound having a hydrophobic cavity compared to the moles of hydrophobe groups of the associative thickeners is in the range of 1:1 to 1.1:1.

Some of the associative thickeners useful in the present invention have hydrophobic groups ("hydrophobes") that are alkyl hydrocarbons. In describing such an associative thickener, a useful parameter is the average number of carbon atoms in the hydrophobes. The associative thickener might have hydrophobes that are all identical, in which case the average number of carbon atoms in the hydrophobes is the number of carbon atoms in one hydrophobe. In other cases, the associative thickener might have different size hydrophobes (i.e., hydrophobes with different number of carbon atoms); such a case could include at least one molecule with different size hydrophobes attached to the same molecule; or it could include a mixture of molecules in which at least one hydrophobe attached to one molecule has a different size from at least one hydrophobe attached to a different molecule; or it could include both. For any associative thickener with hydrophobes that are alkyl hydrocarbons, the average number of carbon atoms in the hydrophobes is understood to be the total number of all the carbon atoms in all the hydrophobes of a fixed amount of the associative thickener divided by the total number of hydrophobes in that same fixed amount of the associative thickener.

In one group of embodiments, called herein "type 1 blend" embodiments, the tinting composition of the present invention includes at least one highly shear thinning associative thickener, at least one moderately shear thinning associative thickener, and at least one macromolecular organic compound having a hydrophobic cavity.

In type 1 blend embodiments, suitable highly shear thinning associative thickeners may be selected from any of the types of associative thickeners listed herein above, or mixtures thereof, preferred are HEURs, HASEs, and mixtures thereof. Suitable as highly shear thinning associative thickeners are those associative thickeners with shear thinning indicator above 250; preferred are those with 251 to 500; more preferred are those with 275 to 475.

In type 1 blend embodiments, suitable moderately shear thinning associative thickeners may be selected from any of the types of associative thickeners listed herein above or mixtures thereof, preferred are HEURs, HASEs, and mixtures thereof. Suitable as moderately shear thinning associative thickeners are those associative thickeners with shear thinning indicator above 20 and less than or equal to 250; preferred are those with 50 to 200; more preferred are those with 75 to 150.

In type 1 blend embodiments, suitable macromolecular organic compounds having a hydrophobic cavity include any of those listed herein above or mixtures thereof, preferred are cyclodextrin, cyclodextrin derivatives, and mixtures thereof, more preferred are methyl-□-cyclodextrin, hydroxypropyl-□-cyclodextrin, and mixtures thereof, most preferred is methyl-□-cyclodextrin.

In some type 1 blend embodiments of the present invention, the preferred ratio of the weight of the solids of the at least one highly shear thinning associative thickener to the weight of the solids of the at least one moderately shear thinning associative thickener is from 0.02:1 to 2:1; more preferred is from 0.05:1 to 0.75:1. In one possible type 1 blend embodiment, all the associative thickeners in the blend are HEURs, and in such an embodiment the preferred ratio is from 0.07:1 to 0.15:1; more preferred is from 0.08:1 to 0.12:1. In another possible type 1 blend embodiment, all the highly shear thinning associative thickeners are HASEs and all the moderately shear thinning associative thickeners are HEURs, and in such an embodiment the preferred ratio is from 0.25:1 to 0.7:1; more preferred is from 0.4:1 to 0.6:1; even more preferred is from 0.49:1 to 0.57:1.

In some type 1 blend embodiments, one or more of the associative thickeners may be principally made of linear molecules that have hydrophilic middle segments and hydrophobic end segments. Examples of such linear associative thickeners are disclosed in U.S. Pat. No. 4,079,028. In some of these embodiments, the hydrophobic end segments are alkyl hydrocarbons with 4 to 30 carbon atoms. Among linear associative thickeners with alkyl hydrocarbon end segments, those with more carbon atoms in the end segment are generally thought to have higher shear-thinning indicators than similar associative thickeners with fewer carbon atoms in the hydrophobic segment. Those that have both longer hydrophilic middle segments and higher numbers of carbon atoms in the hydrophobic segment are thought to have especially high shear-thinning indicators.

In some embodiments (called herein "bilinear" embodiments) of the present invention, both the highly and the moderately shear thinning associative thickeners are principally made of linear molecules that have hydrophilic middle segments and that have hydrophobes that are alkyl hydrocarbon end segments. In bilinear embodiments, it is preferred that the average number of carbon atoms in the hydrophobes of the highly shear thinning associative thickener(s) exceed the average number of carbon atoms in the hydrophobes of the moderately shear thinning associative thickener(s) by a difference of at least 2; more preferred is a difference of at least 4; even more preferred is a difference of at least 6; most preferred is a difference of at least 8.

In some bilinear embodiments of the present invention, it is also preferred, independently of the nature of the hydrophobes, that the hydrophilic segment of the moderately shear thinning associative thickener(s) be shorter than that of the highly shear thinning associative thickener(s); more preferred are moderately shear thinning associative thickener(s) with hydrophilic segments with molecular weights that are at most 80% of the molecular weight of the hydrophilic segment of the highly shear thinning associative thickener(s); most preferred is at most 60%.

In some type 1 blend embodiments, the ratio of the weight of the solids of the macromolecular organic compound having a hydrophobic cavity to the sum of the weights of the solids of the highly shear thinning associative thickener and the solids of the moderately shear thinning associative thickener is from 0.03:1 to 1:1; more preferred is from 0.08:1 to 0.8:1; even more preferred is from 0.1:1 to 0.6:1.

The tinting composition of this invention may be added to a base paint to prepare the coating composition. The tinting composition is added to change the color of the base paint, or to modify the color or the appearance of a coating prepared from the coating composition. The base paint may be a nonaqueous base paint or an aqueous base paint. Further, the base paint may be a neutral base paint useful for preparing clear coatings or a white base paint. The neutral base paint does not contain titanium dioxide or other materials which provide opacity. The white base paint typically contains titanium dioxide or one or more other white pigments and is used to prepare opaque coatings.

The titanium dioxide is contained in the white base paint as particles. The titanium dioxide particles typically have an average diameter in the range of 80 nm to 250 nm and may have a coating of silica or a coating of alumina. Suitable forms of titanium dioxide include rutile titanium dioxide and anatase titanium dioxide. The white base paint may contain titanium dioxide at a level of 58 g/liter to 2034 g/liter (10 lbs/100 gal to 350 lbs/100 gal) of aqueous base paint. In some cases, the white base paint may contain titanium dioxide at a level of 12 g/liter to 420 g/liter (10 lbs/100 gal to 350 lbs/100 gal of aqueous base paint.

In some embodiments, the base paint contains one or more minerals, instead of or in addition to titanium dioxide. Such minerals may include, for example, clay, calcium carbonate, silicates, sand, or mixtures thereof. Generally, such minerals are present as particles; particle size may be smaller or larger than that of titanium dioxide.

The nonaqueous base paint contains polymer binder such as acrylic copolymers, polyurethane polymers, polysulphide polymers, and alkyds; and solvents such as toluene, alcohols, and ketones.

The aqueous base paint contains polymer binder and rheology modifier. The polymer binder is dispersed as polymer particles in the aqueous medium of the aqueous base paint and may have average particle diameters in the range of 20 nm to 1000 nm. Suitable polymer binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate copolymers, styrene/butadiene copolymers polyester polymer, polyethers and the like, and mixtures thereof. The polymer binder may be provided as an aqueous dispersion such as an emulsion polymer. The polymer binder may be chosen to provide a coating, which is prepared from the aqueous coating composition, with properties such as adhesion to a substrate, gloss, abrasion resistance, and barrier properties such as moisture resistance and solvent resistance. The level of binder in the aqueous base paint may be in the range of 145 g/liter to 2034 g/liter (25 dry lbs/100 gal to 350 dry lbs/100 gal) of the aqueous base paint. In some cases, the level of binder in the aqueous base paint may be in the range of 30 g/liter to 420 g/liter (25 dry lbs/100 gal to 350 dry lbs/100 gal) of the aqueous base paint.

The aqueous base paint also contains at least one rheology modifier to thicken the aqueous base paint and to modify the rheology to allow application on substrates without excessive splattering or dripping of the aqueous coating composition, or sag of the wet paint film. Typically more than one rheology modifier is added to a paint to provide an aqueous paint with the desired rheology. Suitable rheology modifiers include nonhydrophobically modified rheology modifiers such as hydroxyethyl cellulose (HEC), alkali soluble emulsions (ASE), and polyvinyl alcohol; and hydrophobically modified rheology modifiers, also referred to as associative thickeners, such as hydrophobically modified ethylene oxide urethane block copolymers (referred to herein as "HEUR"), hydrophobically modified alkali soluble polymers including hydrophobically modified alkali soluble emulsions (referred to herein as "HASE", hydrophobically-modified celullosics, including hydrophobically-modified hydroxyethyl cellulose (referred to herein as "HMHEC"), hydrophobically modified poly(acrylamide); and mixtures thereof. In some cases, the rheology modifier may be present at a level of 1.2 g/liter to 24 g/liter (1 lb/100 gal to 20 lb/100 gal) of the aqueous base paint.

As used herein, a "volatile organic compound" (VOC) is defined herein as a carbon containing compound that has a boiling point below 280° C. at atmospheric pressure, compounds such as water and ammonia being excluded from VOCs. A volatile organic compound (VOC) may be added to a coating composition to improve the film properties or to aid in the application properties of the coating composition. Examples of such compounds include solvents and coalescents such as glycol ethers, organic esters, aromatic compounds, ethylene and propylene glycol, and aliphatic hydrocarbons.

In one embodiment, the aqueous base paint is a low VOC composition containing from 0 to less than 6% VOC by weight, preferably from 0 to less than to 3% VOC, and more preferably from 0 to less than 2% VOC, based on the total weight of the aqueous base paint. An aqueous coating composition containing from 0 to less than 6% VOC by weight, preferably from 0 to less than to 3% VOC, and more preferably from 0 to less than 2% VOC, based on the total weight of the aqueous coating composition, may be prepared from an aqueous base paint having a low VOC composition.

In one embodiment, the base paint contains at least one associative thickener. The associative thickener may be present in the aqueous composition at a level of at least 0.05% by weight of solids, based on the weight of the composition.

The method of this invention includes the step of adding the tinting composition of this invention to a base paint to prepare a coating composition. This step is easily achieved by the addition of the tinting composition with mixing.

The composition and method of the invention are useful for improving the viscosity stability of a composition, particularly upon the addition of a colorant component containing high levels of surfactant. The composition and method of the invention are not limited by the type of colorant component that is added to the composition and are useful for any colorant component that contains surfactant or other additives that may interfere with the non-specific associations of the associative thickeners added to the composition.

The method of this invention includes the step of adding the tinting composition of this invention to a base paint to prepare the coating composition. This step is easily achieved by the addition of the tinting composition with mixing. The amount of tinting composition added to the base paint may be in the range of 7.8 ml/liter (1 oz/gal) to 31.2 ml/liter (4 oz/gal) to prepare a light-tint coating composition, from 31.2 ml/liter (4 oz/gal) to 62.5 ml/liter (8 oz/gal) to prepare a mid-tone coating composition, and from 62.5 ml/liter (8 oz/gal) to 93.7 ml/liter (12 oz/gal) to prepare a deep tone coating composition.

The tinting composition and the method of this invention are useful for improving the viscosity stability of a coating composition, particularly upon the addition of the tinting composition to a base paint containing at least one associative thickener. The composition and method of the invention are not limited by the type of pigment that is added to the coating composition. The water-resistance properties, including blister resistance, wet adhesion, and scrub resistance of the compositions prepared using the tinting composition and method of this invention, are expected to be improved because of the low molecular weight materials such as surfactants may be complexed with the macromolecular organic compounds having a hydrophobic cavity. Further, coating compositions prepared using the tinting compositions and the method of this invention, may react more predictably to added tinting compositions, making color matching easier and facilitating the use of software for color matching. Also, viscosity fluctuation in the coating composition is expected to be reduced. Further, the freeze-thaw stability of the coating composition, the dispensing of the tinting composition (no clogs) and the sag resistance properties of wet films prepared from coating compositions using the tinting compositions and method of the invention are expected to be improved.

The coating composition may be free of organic solvent or it may contain a coalescing solvent. The coating composition may contain typical coating additives such as fillers, defoamers, cross-linkers, catalysts, surfactants, stabilizers, anti-flocculants, coalescents, waxes, antioxidants, and suitable solvents, such as water miscible solvents.

The coating composition of this invention may be applied by methods well known in the art such as air-assisted spray, airless spray, plural component spray, brush, roller squeegee, roll coater, curtain coater, and the like. Substrates to which the coating composition may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; and leather. The coating composition may be used, for example, as a wood coating, maintenance coating, interior or exterior wall coating, metal primer or coating, plastics coating, traffic paint, leather coating, coil coating, architectural coating. Coatings prepared from the coating composition may be flat coatings, satin coatings, semi-gloss coatings, gloss coatings, primer, textured coatings, and the like.

One class of coatings whose viscosity stability may be improved by the use of the present invention are coatings designed for use in exterior insulation and finish systems (EIFSs). EIFSs have been described in U.S. patent application Ser. No. 09/933,405. An EIFS is a multilayer construction for exterior walls that normally contain at least one layer that contains polymer and filler such as clay and/or calcium carbonate. Such a polymer-containing EIFS layer may also contain masonry and/or aggregate such as sand. Such a layer generally contains one or more thickeners to provide desirable rheology characteristics, which include for example the ability to allow application of thick films on vertical substrates, the correct KU viscosity (as measured by Stormer viscometer), sufficient viscosity to remain on a horizontal trowel without running off, and the ability to resist sagging when applied to a vertical surface. Some EIFSs layers are aqueous systems containing latex polymers. The present invention is contemplated for use in any layer or layers of an EIFS system that is applied as a coating.

The tinting composition and method of the present invention are particularly useful in systems employing delayed product differentiation, including tinting and mixing of the product components at the point-of-manufacture, point-of-sale or point-of-use, such as those disclosed in U.S. Provisional Applications Serial Nos. 60/183,655 filed Feb. 18, 2000, 60/183,656 filed Feb. 18, 2000, and 60/247,639 filed Nov. 10, 2000.

All ranges used herein are inclusive and combinable. Some embodiments of the present invention will now be described in detail in the following Examples.

In the following examples, these test procedures are used:

Finish Coat KU Viscosity: Viscosity of the composition before application; measured with a Stormer viscometer using a wire paddle ("Finish Coat KU Viscosity" is measured with a wire paddle, unlike the standard paddle used in the "Krebs-Stormer" (also called "KU") viscosity test.

Finish Coat Rheology: A typical load of coating composition is placed on a horizontal trowel. If the composition runs off the trowel, its rheology is said to be "loose"; otherwise it is "good."

Texture Ability: After the composition has been applied and allowed to sit for several minutes, a tool such as a trowel or a screed tool is drawn over its surface to create grooves. If the composition is dragged with the tool or if threads of composition are pulled out of the mass, the texture ability is "poor." If neat grooves are formed, it is "good."

Sag after Texturing: After application to a vertical surface, the composition is textured. The amount of movement of the texture grooves is reported. In order of increasing amount of movement, the ratings are "none," "slight," "some," and "significant."

The Krebs-Stormer viscosity was measured using ASTM method D562.

EXAMPLE 1

Preparation of Base Paint Containing HEUR Associative Thickener

A base paint was prepared containing associative thickeners. The associative thickeners were hydrophobically modified ethylene oxide urethane block copolymers. First, a paint grind was prepared by combining the materials in the order listed in Table 1.1.

TABLE 1.1

| Paint Grind | |
|---|---|
| Material | Amount |
| propylene glycol | 34.56 g |
| Water | 25.04 g |
| Tamol ™ 731 dispersant | 6.89 g |
| clay | 70.00 g |
| Foamaster ™ PL defoamer | 0.89 g |
| Nuosept ™ 95 biocide | 0.07 g |

Tamol is a trademark of Rohm and Haas Company.
Foamaster is a trademark of Cognis Corp.
Nuosept is a trademark of the Huls America Corp.

Next, a base paint was prepared by combining the paint grind with the materials listed in Table 1.2.

TABLE 1.2

| Base Paint Containing HEUR Associative Thickener | |
|---|---|
| Material | Amount |
| Water | 150.25 g |
| Acrysol ™ SCT-275 rheology modifier (HEUR) | 26.00 g |
| ammonia (28%) | 2.00 g |

TABLE 1.2-continued

Base Paint Containing HEUR Associative Thickener

| Material | Amount |
|---|---|
| Triton™ X-100 surfactant | 4.45 g |
| Texanol™ coalescent | 15.80 g |
| propylene glycol | 8.64 g |
| polyvinyl acetate polymer binder | 472.50 g |
| propylene glycol | 8.64 g |
| polyvinyl acetate polymer binder | 472.50 g |

Acrysol is a trademark of Rohm and Haas Company.
Triton is a trademark of Dow Chemical Co.
Texanol is a trademark of Eastman Chemical Co.
Isopar is a trademark of Exxon Corp.

The base paint is an aqueous base paint containing a HEUR associative thickener and had a pH of 8.4, a PVC of 10.5% and a VS of 30%.

EXAMPLE 2

Preparation of Base Paint Containing HASE Associative Thickener

A base paint was prepared containing an associative thickener. The associative thickener was a hydrophobically modified alkali soluble emulsion. First, a paint grind was prepared by according to the procedure in Table 1.1. Next, a base paint was prepared according to the procedure in Table 1.2 except that 14.00 g of Acrysol™ DR-73 rheology modifier (HASE) was substituted for the Acrysol™ SCT-275 rheology modifier.

The base paint was an aqueous base paint containing a HASE associative thickener and had a pH of 8.5, a PVC of 10.5%, and a VS of 30%.

EXAMPLE 3

Coating Composition Containing Tinting Composition Containing Associative Thickener and Macromolecular Organic Compound Having a Hydrophobic Cavity An additive mixture was prepared by combining 2 parts by dry weight of Acrysol™ RM-8 rheology modifier (Rohm and Haas Company), an HEUR associative thickener, and 1 part by dry weight of methyl-β-cyclodextrin. The additive mixture was added to several colorant compositions at levels of 5, 10 and 15 dry weight % with mixing to prepare the tinting compositions.

The coating compositions were prepared by mixing the tinting compositions into the base paints of Example 1 and Example 2 at a level of 93.7 ml/liter (12 oz/gal). The Krebs-Stormer viscosity of the coating compositions were measured prior to and 24 hours after the addition of the tinting compositions.

TABLE 3.1

Viscosity Decrease (KU) for Coating Composition Containing HEUR Rheology Modifier and Tinting Composition

| % Additive Mixture in Tinting Composition | White | Blue | Yellow | Black |
|---|---|---|---|---|
| 0 | −11 | −28 | −18 | −32 |
| 5 | 1 | −23 | −7 | −25 |
| 10 | 8 | −15 | −1 | −18 |
| 15 | 15 | 10 | 7 | −11 |

TABLE 3.2

Viscosity Decrease (KU) for Coating Composition Containing HASE Rheology Modifier and Tinting Composition

| % Additive Mixture in Tinting Composition | White | Blue | Yellow | Black |
|---|---|---|---|---|
| 0 | −2 | −12 | −6 | −10 |
| 5 | 12 | −6 | 12 | −5 |
| 10 | 23 | −1 | 14 | 3 |
| 15 | 34 | 7 | 23 | 13 |

The results in Table 3.1 and Table 3.2 show that the tinting compositions containing the combination of associative thickener and macromolecular organic compound having a hydrophobic cavity as additives provided coating compositions with smaller viscosity decreases compared to the colorant composition which did not contain an additive.

EXAMPLE 4

Coating Composition Containing Tinting Composition Containing Associative Thickener A base paint was prepared containing associative thickeners. The associative thickeners were hydrophobically modified ethylene oxide urethane block copolymers. First, a titanium dioxide grind was prepared by combining the materials in the order listed in Table 4.1.

TABLE 4.1

Titanium Dioxide Grind

| Material | Amount |
|---|---|
| Water | 53.11 g |
| propylene glycol | 1.70 g |
| Tamol™ 731 dispersant | 1.00 g |
| Triton™ CR-10 surfactant | 0.07 g |
| Foamaster™ VL defoamer | 0.10 g |
| Kathon™ LX (1.5%) | 0.07 g |
| Rhoplex™ SG-10M polymer binder | 200.00 g |
| Ti-Pure™ R-706 titanium dioxide | 25.00 g |
| Acrysol™ RM-2020 NPR rheology modifier | 10.00 g |
| Water | 50.00 g |

Kathon, Rhoplex, and Acrysol are trademarks of Rohm and Haas Company.
Foamaster is a trademark of Cognis Corp.
Ti-Pure is a trademark of E.I. DuPont de Nemours and Co.

Next, a base paint was prepared by combining the titanium dioxide grind with the materials listed in Table 4.2.

TABLE 4.2

Aqueous Base Paint Formulation

| Material | Amount |
| --- | --- |
| Water | 62.78 g |
| Rhoplex ™ SG-10M polymer binder | 403.13 g |
| Ropaque ™ Ultra plastic pigment | 5.60 g |
| Texanol ™ coalescent | 30.33 g |
| ammonia (28%) | 1.43 g |
| Acrysol ™ RM-2020 NPR rheology modifier | 14.24 g |
| Acrysol ™ RM-825 rheology modifier | 0.65 g |
| Foamaster ™ VL defoamer | 2.00 g |
| water | 25.00 g |

Ropaque is a trademark of Rohm and Haas Company.
Texanol is a trademark of Eastman Chemical Co.

The base paint was an aqueous base paint containing HEUR associative thickeners and had a PVC of 3.3% and a VS of 33.8%.

A phthalo blue colorant composition (100 g) was formulated with 10.5 g of Acrysol™ RM-825 rheology modifier (25% active) and 6 g water to prepare the tinting composition. The Acrysol™ RM-825 rheology modifier is a HEUR associative thickener. The coating composition, Example 4.1, was prepared by admixing 20.51 g of the tinting composition into 100 g of the base paint. A comparative coating composition, Comparative A, was prepared by adding 20.51 g of a mixture of 100 g of the phthalo blue colorant composition and 16.5 g water to the base paint.

TABLE 4.3

Viscosity Decrease (KU) for Coating Composition Containing HEUR Rheology Modifier and Tinting Composition Containing Associative Thickener

| Coating Composition | Viscosity Change (KU) |
| --- | --- |
| Example 4.1 | −15 |
| Comparative A | −27 |

The results in Table 4.3 show that the tinting composition of this invention, which contains an associative thickener, provided a coating composition with a smaller decrease in viscosity compared to the comparative coating composition containing the colorant composition.

EXAMPLE 5

Coating Composition Containing Tinting Composition Containing Macromolecular Organic Compound Having a Hydrophobic Cavity The base paint was an aqueous base paint containing HEUR associative thickeners, prepared in Example 4.

A phthalo blue colorant composition (100 g) was formulated with 0.85 g methyl-β-cyclodextrin (50% active) and 15.65 g water to prepare the tinting composition. The coating composition, Example 5.1, was prepared by admixing 20.51 g of the tinting composition into 100 g of the base paint. A comparative coating composition was Comparative A of Example 4.

TABLE 5.1

Viscosity Decrease (KU) for Coating Composition Containing HEUR Rheology Modifier and Tinting Composition Containing Macromolecular organic compound Having a Hydrophobic Cavity

| Coating Composition | Viscosity Change (KU) |
| --- | --- |
| Example 5.1 | −23 |
| Comparative A | −27 |

The results in Table 5.1 show that the tinting composition of this invention, which contains a macromolecular organic compound having a hydrophobic cavity, provided a coating composition with a smaller decrease in viscosity compared to the comparative coating composition containing the colorant composition.

EXAMPLE 6

A base composition for an EIFS finish coat was made as follows:

| Material | Manufacturer | Parts by Weight as supplied |
| --- | --- | --- |
| Rhoplex ™ EI-2000 (46.5% solids) latex | Rohm and Haas Co. | 305.00 |
| Ethylene Glycol | (commodity) | 5.00 |
| Nopco ™ NXZ defoamer | Henkel | 2.00 |
| TiPure ™ R-942 pigment | E.I. DuPont | 65.0 |
| 15 mesh sand | (commodity) | 150.0 |
| 90 mesh sand | (commodity) | 850.0 |
| Copper Nitrate (2% Solution) | (commodity) | 4.0 |
| Texanol ™ coalescent | Eastman | 6.0 |
| Skane ™ M-8 biocide | Rohm and Haas Co. | 2.0 |
| Acrysol ™ ASE-60 (28% solids) alkali-swellable emulsion | Rohm and Haas Co. | 6.0 |
| Water | (commodity) | 16.8 |
| Ammonium Hydroxide | (commodity) | 2.0 |

EXAMPLE 7

The following thickener packages of the invention and the comparative package were made, using the Associative Thickeners shown and using methyl-β-cyclodextrin (m-β-CD). "Parts" herein means "parts by weight" of the ingredient listed, as supplied:

| Package | Highly Shear-Thinning Associative Thickener | Moderately Shear-Thinning Associative Thickener | m-β-CD |
| --- | --- | --- | --- |
| Comparative A | none | 10 parts RM-8W | 1 part |
| Package B | 1 part RM-12W | 8 parts RM-8W | 1 part |
| Package C | 3.5 parts TT-615 | 12 parts SCT-275 | 1 part |

EXAMPLES 8–12

In Examples 8–12, the base formulation of Example 6 was further formulated to make a variety of useful compositions.

In each example 100 g of Example 1 was used. When Lamp Black (colorant Lamp Black B, from Colortrend Co.) was used, the amount was chosen to correspond to 93.8 ml/liter.

| Example No. | Weight of Lamp Black (g) | Added Thickener Package Type | Amount (g) |
|---|---|---|---|
| 8 (comparative) | 0 | none | 0 |
| 9 (comparative) | 7 | none | 0 |
| 10 (comparative) | 7 | comparative A | 0.45 |
| 11 | 7 | B | 0.45 |
| 12 | 7 | C | 1.3 |

EXAMPLES 13–17

Testing Results

The formulations of Examples 8–12 were tested, and the results were as follows, with comparative examples labeled with "C" next to their example numbers.

| Example No. | Material Tested (Example No.) | Finish Coat Rheology | Trowel Release | Texture Ability | Sag after Texturing | Finish Coat KU Viscosity |
|---|---|---|---|---|---|---|
| 13C | 8C | good | good | good | none | 114 |
| 14C | 9C | too loose | poor | poor | significant | 86 |
| 15C | 10C | good | good | medium | some | 108 |
| 16 | 11 | good | good | good | slight | 120 |
| 17 | 12 | good | good | good | slight | 132 |

These examples show that the colorant-free sample, #13C, performed acceptably. The addition of colorant alone (#14C) caused poor performance in all tests. Addition of colorant with only a single thickener (#15C) left the formulation with degraded performance in texture ability, sag after texturing, and Finish Coat KU viscosity. However, the examples of the present invention (#16 and #17) showed performance comparable to that of the colorant-free sample.

EXAMPLES 18–21

Tinting Compositions

Tinting compositions are made as follows:

| Example No. | Lamp Black (g) | Added Thickener Package Type | Amount (g) |
|---|---|---|---|
| 18 (comparative) | 7 | none | 0 |
| 19 (comparative) | 7 | comparative A | 0.45 |
| 20 | 7 | B | 0.45 |
| 21 | 7 | C | 1.3 |

EXAMPLES 22–25

Coating Compositions and Test Results:

Coating Compositions are Made and Tested Using the Tinting Compositions of Examples 18–21. Each Coating Composition Has 100 g of Example 1 and a Tinting Composition. Compositions and Results are as Follows (Comparative Examples are Labeled With "C" Next to Their Example Numbers):

| Example No. | Tinting Composition (Example No.) | Finish Coat Rheology | Trowel Release | Texture Ability | Sag after Texturing | Finish Coat KU Viscosity |
|---|---|---|---|---|---|---|
| 22C | 18C | too loose | poor | poor | significant | 86 |
| 23C | 19C | good | good | medium | some | 108 |
| 24 | 20 | good | good | good | slight | 120 |
| 25 | 21 | good | good | good | slight | 132 |

We claim:

1. A tinting composition comprising:
   a) at least one colorant composition; and
   b) from 0.05 to 15% dry weight of at least one additive based on the weight of said at least one colorant composition,
   wherein said additive comprises at least one highly shear thinning associative thickener, at least one moderately shear thinning associative thickener, and at least one macromolecular organic compound having a hydrophobic cavity.

2. The tinting composition according to claim 1, wherein said highly shear thinning associative thickener comprises a nonionic hydrophobically modified ethylene oxide urethane block copolymer, and wherein said moderately shear thinning associative thickener comprises a nonionic hydrophobically modified ethylene oxide urethane block copolymer.

3. The tinting composition of claim 2,
   (a) wherein said highly shear thinning associative thickener is principally made of linear molecules that have hydrophilic middle segments and that have hydrophobes that are alkyl hydrocarbon end segments with 4 to 30 carbon atoms;
   (b) wherein said moderately shear thinning associative thickener is principally made of linear molecules that have hydrophilic middle segments and that have hydrophobes that are alkyl hydrocarbon end segments with 4 to 30 carbon atoms;
   (c) wherein the average number of carbon atoms in said hydrophobes of said molecules of said highly shear thinning associative thickener is at least 2 more than the average number of carbon atoms in said hydrophobes of said molecules of said moderately shear thinning associative thickener; and
   (d) wherein the molecular weight of said hydrophilic middle segment of said moderately shear thinning associative thickener is at most 80% of the molecular weight of said hydrophilic middle segment of said highly shear thinning associative thickener.

4. The tinting composition according to claim 1, wherein said highly shear thinning associative thickener comprises a hydrophobically modified alkali soluble polymer, and wherein said moderately shear thinning associative thickener comprises a nonionic hydrophobically modified ethylene oxide urethane block copolymer.

5. A method of improving the viscosity stability of a coating composition upon the addition of a colorant component, comprising the steps of:

a) providing a base paint; and
b) adding to said base paint, a tinting composition comprising:
   i) at least one colorant composition; and
   ii) from 0.05 to 15% dry weight of at least one additive based on the weight of said at least one colorant compositions, wherein said additive comprises at least one highly shear thinning associative thickener, at least one moderately shear thinning associative thickener, and at least one macromolecular organic compound having a hydrophobic cavity.

* * * * *